July 10, 1951  C. S. BATCHELOR ET AL  2,559,747
PRODUCTION OF CONE CLUTCH MEMBERS
Filed June 4, 1948  2 Sheets-Sheet 1

Inventors:
Clyde S. Batchelor
Frederick C. Stanley
By: Lee J. Gary
Attorney

July 10, 1951 C. S. BATCHELOR ET AL 2,559,747
PRODUCTION OF CONE CLUTCH MEMBERS
Filed June 4, 1948 2 Sheets-Sheet 2

Inventors:
Clyde S. Batchelor
Frederick C. Stanley
By: Lee J. Gary
Attorney.

Patented July 10, 1951

2,559,747

UNITED STATES PATENT OFFICE 2,559,747

PRODUCTION OF CONE CLUTCH MEMBERS

Clyde S. Batchelor, Upper Stepney, and Frederick C. Stanley, Fairfield, Conn., assignors to Raybestos-Manhattan, Inc., Passaic, N. J., a corporation of New Jersey Application June 4, 1948, Serial No. 31,056

4 Claims. (Cl. 154—81)

This invention relates to the production of cone clutch elements adapted for use as a driving or driven member capable of transmitting high torque by means of low pressure on one or both of its faces and suitable for heavy duty use, such as, for trucks, tractors, marine engines and the like.

More particularly, the present invention relates to the provision of cone clutches lined with endless ring, asbestos-base or other non-metallic molded composition friction material facings of novel character and to the method of making the same.

Other objects and advantages will be apparent from a consideration of the following specification and drawings, wherein.

Figure 1:
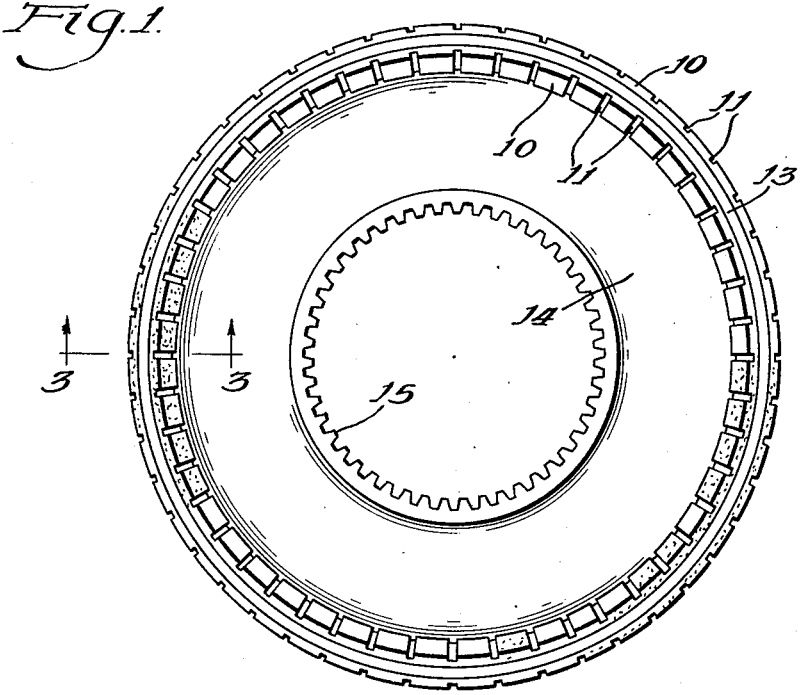
Fig. 1 is a top plan view of a cone clutch member formed in accordance with the present invention.
Figure 2:
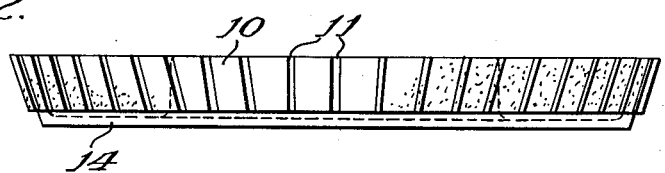
Fig. 2 is a side elevational view thereof.
Figure 3:
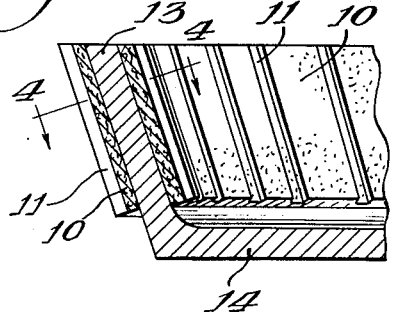
Fig. 3 is an enlarged fragmentary section on the line 3—3 of Fig. 1.
Figure 4:
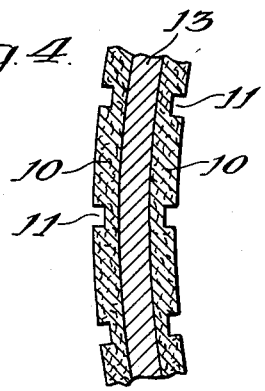
Fig. 4 is a fragmentary section on the line 4—4 of Fig. 3.
Figure 5:
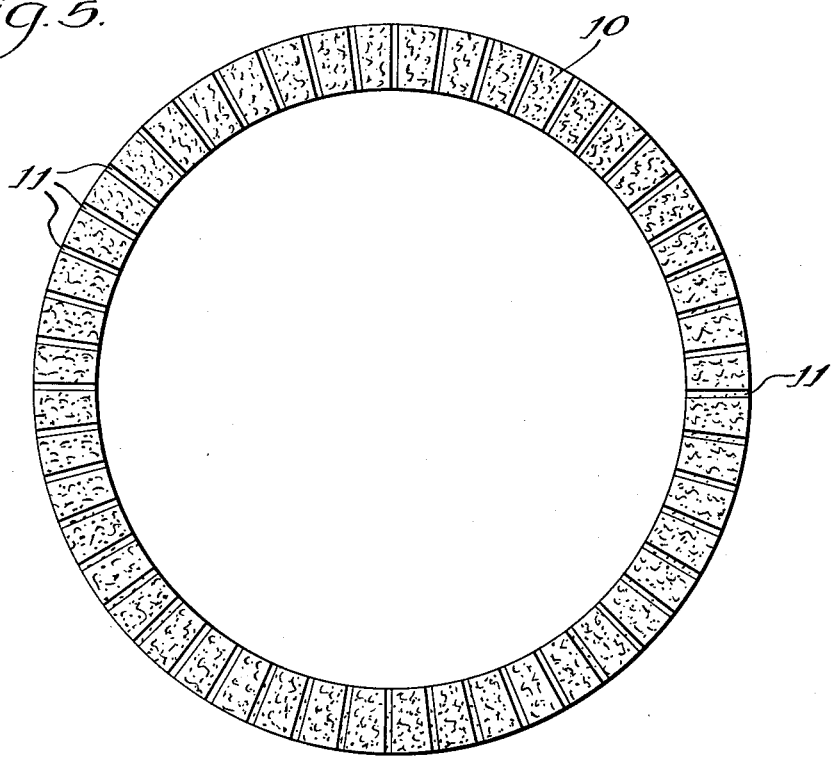
Fig. 5 is a plan view of a flat molded clutch facing prior to shaping and application to a supporting member.
Figure 6:
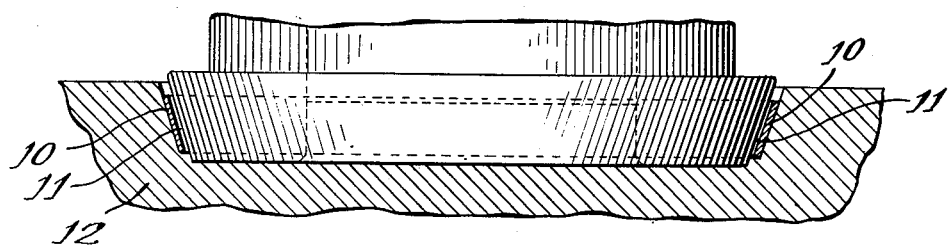

Fig. 6 diagrammatically illustrates means for shaping the flat element of Fig. 5 to frusto-conical form.

Referring to the drawings, the first step comprises the formation of the friction facing 10 in the planar or flat form shown in Fig. 5. The element 10 may be composed of any well known friction material compositions such as those generally comprising a substantially uniform admixture of fibrous material such as asbestos fibers, a suitable heat hardenable binder such as a rubber material, drying oil, thermosetting resin, or their combinations, together with curing agents if required, and conventional inert fillers and friction material particles. The component proportions of these materials or their specific nature may be modified and varied, as well understood in the friction material art, to provide the necessary strength and friction properties.

In forming the initial flat ring 10, the component materials are first intimately admixed in a suitable mixer to obtain random distribution of the asbestos fibers and to ultimately provide substantially uniform strength in all directions. The composition is thereafter molded to substantially the desired shape and thickness, but in flat form, in a suitable heated mold, at a densifying pressure of, for example 2000-3000 pounds per square inch, while heating to but partially cure the binder. With, for example, a binder of the thermosetting or phenolic-aldehyde type heating may be to a temperature of 280-290° F. to cure to the "B" stage. It will be understood that time, temperature and thickness of the piece must be correlated.

One surface of the element 10, which is to become its outer or operative surface, is provided with the regularly spaced radial grooves 11. These grooves may be directly molded into the ring 10, or they may later be cut in by suitable means. These grooves are of advantage in the subsequent step of shaping the flat rings of frusto-conical form in that they aid in permitting the ring, especially when it is of a relatively thick nature as is here contemplated, to be deformed to the new shape. Thus, the resultant partially segmented nature of the one surface provides ease in expansion thereof when it is to become the outer peripheral face in the new shape or condensation thereof when it is to become the inner peripheral face in the new shape, and the reduced thickness of the material between the segmented surface aids in permitting the ring to take on the new shape and minimizes rupture on deformation, particularly in its subsequently binder plasticized condition, as will be hereinafter described.

The provision of the radial grooves further provides the completed clutch facings with scavenger slots and air-cooling vents, and is additionally of benefit when the unit is employed as an oil clutch, although it will be understood that the clutches of the present invention are not limited to the latter use.

After the planar ring has thus been formed by pressure to obtain a maximum density with limited cure or heat-hardening of the binder, it may be ground to accurate shape and to provide it with a uniform thickness and to bring the faces into parallelism.

The next step in the process is to place the planar rings between flat platens of a hot press under light-holding pressure for a short time adequate only to plasticize their binder content after which they are rapidly transferred while in heated condition to a cold cone mold or die 12, as illustrated in Fig. 6 and distorted or reshaped to frusto-conical ring form, the grooves 11 aiding materially in this operation as previously indicated.

The thus formed facings are thereafter applied to metallic supporting members, previously shaped from steel discs, which may be of a thickness approximately equal to that of a single molded facing, and may be applied to either the inner or outer or both of the frusto-conical faces thereof, as illustrated in Figures 1 to 4. As illustrated, these metallic supports comprise a frusto-conical section 13 and an integral annular flange 14. As further illustrated, the inner periphery of the flange 14 may be provided with splines 15 for engagement with splines of a clutch shaft or, in the alternative, although not illustrated, the flange 14 may be formed with suitable apertures for bolt engagement of the unit to a suitable hub of a drive or crank shaft or the like.

The molded and reshaped facings 10 are applied and secured to the metallic rims 13 by means of a suitable heat-hardenable or thermosetting bonding adhesive such as a rubber, resin or rubber-resin cement of conventional character. Thereafter, the composite or assembly is given a final baking, in either an oven or a mold, to heat-harden or fully cure the binder content of the molded facings and to likewise cure and harden the bonding or cementing agent.

We claim as our invention:

1. The method of forming a conical friction element which comprises heating a pre-form, composed of a molded and densified friction material composition flat ring having radial surface grooves and containing a heat-hardenable binder in but partially cured condition, to plasticize said binder and shaping said ring while in heated condition to frusto-conical form while maintaining its opposed faces in substantially parallel relationship to each other and cooling it while restraining it in said new shape.

2. The method of forming a cone clutch friction facing which comprises molding a friction material composition including a heat-hardenable binder, to endless planar ring form under pressure and heat to densify the composition and to partially cure the binder, providing one face of said ring with regularly spaced radial grooves, subsequently reheating said ring to plasticize its binder content, shaping said ring while in heated condition to frusto-conical form while maintaining its opposed faces in substantially parallel relationship to each other and cooling it while restraining it in said new shape with the binder in incompletely cured condition.

3. The method of forming a cone clutch friction facing which comprises molding a fibrous asbestos friction material composition including a heat-hardenable binder, to endless planar ring form under pressure and heat to densify the composition and to partially cure the binder, forming radial grooves in one face of said ring, subsequently reheating said ring to plasticize its binder content, shaping said ring while in heated condition to frusto-conical form while maintaining its opposed faces in substantially parallel relationship to each other and cooling it while restraining it in said new shape.

4. The method of forming a cone clutch friction facing which comprises molding a fibrous asbestos friction material composition including a heat-hardenable binder, to endless planar ring form under pressure and heat to densify the composition and to partially cure the binder while simultaneously molding radial grooves into one face of said ring, subsequently reheating said ring to plasticize its binder content, shaping said ring while in heated condition to frusto-conical form while maintaining its opposed faces in substantially parallel relationship to each other and cooling it while restraining it in said new shape.

CLYDE S. BATCHELOR.
FREDERICK C. STANLEY.

REFERENCES CITED

The following references are of record in the file of this patent:

UNITED STATES PATENTS

| Number | Name | Date |
| --- | --- | --- |
| 1,180,503 | Kelley | Apr. 25, 1916 |
| 1,284,296 | Frederick | Nov. 12, 1918 |
| 1,728,594 | Cudahy | Sept. 17, 1929 |
| 1,735,668 | Benge | Nov. 12, 1929 |
| 1,737,455 | Frederick | Nov. 26, 1929 |
| 1,777,829 | Edgecumbe | Oct. 7, 1930 |
| 1,785,391 | Russell | Dec. 16, 1930 |
| 2,045,453 | Emrick | June 23, 1936 |
| 2,059,576 | Glick | Nov. 3, 1936 |
| 2,062,480 | Stanley | Dec. 1, 1936 |
| 2,249,281 | Wellman | July 15, 1941 |
| 2,258,237 | Bockius | Oct. 7, 1941 |
| 2,264,901 | Gosling | Dec. 2, 1941 |
| 2,293,914 | Nanfeldt | Aug. 25, 1942 |
| 2,354,526 | Lapsley et al. | July 25, 1944 |
| 2,369,583 | Lucid | Feb. 13, 1945 |
| 2,406,653 | Batchelor | Aug. 27, 1946 |
| 2,415,097 | Hasimoto | Feb. 4, 1947 |
| 2,416,427 | Bonawit | Feb. 25, 1947 |